United States Patent
Hybre et al.

(10) Patent No.: US 7,623,846 B2
(45) Date of Patent: Nov. 24, 2009

(54) PROCESS FOR THE SECURE MANAGEMENT OF THE EXECUTION OF AN APPLICATION

(75) Inventors: Jean Hybre, Carrieres sur Seine (FR); Jean-Philippe Wary, Bourg la Reine (FR)

(73) Assignee: Societe Francaise du Radiotelephone, Paris (FR)

( * ) Notice: Subject to any disclaimer, the term of this patent is extended or adjusted under 35 U.S.C. 154(b) by 470 days.

(21) Appl. No.: 11/343,076

(22) Filed: Jan. 30, 2006

(65) Prior Publication Data

US 2006/0200668 A1    Sep. 7, 2006

(30) Foreign Application Priority Data

Feb. 4, 2005    (FR) .................................. 05 50323

(51) Int. Cl.
*H04M 1/66* (2006.01)
(52) U.S. Cl. ..................... 455/411; 455/410
(58) Field of Classification Search .............. None
See application file for complete search history.

(56) References Cited

U.S. PATENT DOCUMENTS

| | | | | |
|---|---|---|---|---|
| 6,832,230 | B1 * | 12/2004 | Zilliacus et al. ............ | 707/203 |
| 2003/0088786 | A1 | 5/2003 | Moran et al. ............... | 713/201 |
| 2004/0199787 | A1 * | 10/2004 | Hans et al. ................. | 713/200 |
| 2005/0181819 | A1 * | 8/2005 | Washio et al. ............. | 455/550.1 |

FOREIGN PATENT DOCUMENTS

| EP | 0 813 132 A2 | 12/1997 |
|---|---|---|
| EP | 1 422 958 A1 | 5/2004 |

OTHER PUBLICATIONS

Linuxdevices.com: "Hot Topic: Linux on a roll in mobile phones" INET, Feb. 13, 2003, XP002341583 linuxdevices.com, http://www.linuxdevices.com/news/NS9217324497.html>, pp. 1-3.
D. Russell, G.T. Gangemi: "Computer Security Basics", O'Reilly, Jul. 1, 1992, pp. 66-72, XP002341584.
A. Grünbacher: "POSIX Access Control Lists on Linux", INET, Apr. 4, 2003, XP002341585, Suse, http://www.suse.de/{agruen/acl/linux-acls/online/>, pp. 1-22.
Y. Lepage, P. Iarrera: "Unix Bible", IDG Books Worldwide, Inc., Dec. 31, 2000, pp. 4-16, XP002341586.
Balfanz D: "Usable access control for the world wide web", Proceedings of the 19TH Annual Computer Security Applications Conference, Dec. 8, 2003, pp. 406-415, XP010675112.

* cited by examiner

Primary Examiner—Erika A Gary
(74) Attorney, Agent, or Firm—Perman & Green, LLP

(57) ABSTRACT

To secure the execution of an application on an intelligent mobile telephone, each application is identified by an identifier and a table or rights is associated with each resource on the mobile telephone. Through a table of rights, access rights to the resource can be associated with an application identifier. This makes it possible to manage, for each resource, the applications that are allowed to invoke the resource. Moreover, the rights associated with a resource can only be modified by the owner of the resource.

17 Claims, 2 Drawing Sheets

PROCESS FOR THE SECURE MANAGEMENT OF THE EXECUTION OF AN APPLICATION

CROSS-REFERENCE TO RELATED APPLICATIONS

This application claims priority from French Patent Application No. FR 05 50323, filed on Feb. 5, 2005.

BACKGROUND OF THE INVENTION

The present invention relates to a process for the secure management of the execution of an application. The invention concerns the domain of cellular telephony and more specifically that of intelligent terminals connected to cellular telephony networks. A terminal referred to herein as "intelligent" is a mobile telephone capable of downloading multimedia or active content. The term "active content" refers to a program capable of being executed on a mobile telephone and consequently of implementing the functionalities of the said mobile telephone. It shall be considered that all telephones referred to herein are intelligent terminals. An intelligent telephone enables the management of different internal resources, accessible from the different extension ports or by the downloaded multimedia or active content. This definition does not limit the scope of the invention.

One aim of the invention is to secure the access to the mobile telephone's resources by the programs being executed on the said mobile telephone.

Background art systems implement secured code execution environments. These environments are based on the implementation of a "virtual machine" that is a layer on top of the mobile telephone's operating system. This virtual machine executes programs that are written specifically for it. The virtual machine is therefore a prerequisite for the implementation of these programs. The virtual machine is an intermediary between the specific program and the mobile telephone's operating system, in other words between the specific program and the mobile telephone's functionalities.

However, the fact that a telephone has an incorporated virtual machine does not prevent the implementation of other unspecific programs that access the mobile telephone's functions. A security policy implemented by the virtual machine is therefore defined only for the specific programs.

Furthermore, such policies remain confined to the mobile telephone, and no interaction is planned with the SIM card, for example. One such security model is, for example, the MIDP 2.0 model corresponding to the Java language and virtual machine.

Background art techniques also implement security policies that are managed by domain, in which each application belongs to a domain. A domain defines access rights to precisely defined functionalities, and even to all the telephone's functionalities. In this case all applications must belong to a domain. Consequently, if an application requires specific rights, a new domain must be defined and allocated to it. In other words this involves redefining the rights for all the functionalities of the mobile telephone in which the application is being executed, including for the functionalities that the application does not use. This occupies a large memory capacity.

When rights are managed by domain, rights are updated by domain, in other words for all the applications belonging to the said domain. It is consequently impossible to update rights for a specific application independently from the other applications.

SUMMARY OF THE INVENTION

In the invention these problems are solved by associating an identifier with each application. When an application is active, one instance of the application is managed by the telephone's operating system. This management is generally carried out through a memory context that describes the current state of the instance of the application, the resources consumed, the communication systems used, the parent and child processes linked to the application at a given moment (the list is not exhaustive and does not limit the scope of the invention). This context is the entry point of the operating system for managing priorities and interruptions between or within applications. Within the scope of the invention, the application identifier is a data item with a constant value, this information being supplied by the memory context managed by the operating system for the current instance of the active application. In cases where several instances of the same application are active at the same time, the operating system manages several different memory contexts, but the value of the application identifier is thus the same for all the contexts because we are dealing with the same application code.

In the invention each resource is clearly identified and identifiable as a resource when an application seeks to access it. This resource identification can be implicit because in this case identification is via the use of a clearly identified Application Programming Interface (API) or may be explicit when using a memory address that is clearly included in a memory segment that is itself identified as a resource to be protected. A more exhaustive definition of the concept of resource is provided later. In the invention each resource is associated with an application identifier table, each identifier in this list being associated with a right related to the resource. When the application seeks to access a resource or functionality on the mobile telephone, the operating system scans the table associated with the resource to determine whether the application has been identified and extract the rights owned by the application relative to the resource. The subsequent execution of the application is dictated by the reading of the rights.

In the invention each resource is associated with an owner who is alone authorised to modify the table associated with the resource.

The invention therefore enables the detailed definition of rights associated with an application and the subsequent modification of the rights without influencing the other applications.

The invention therefore relates to a secured management process for the execution of applications on a mobile telephone, an application accessing resources on the mobile telephone that are managed by an operating system wherein a resource on the mobile telephone is identifiable and associated with a table of identifiers of applications that may or may not be authorised to implement the resource, the latter having an owner, alone authorised to update the list of applications, the operating system applying, for each accessed resource, the list of rights corresponding to the accessing application, and each application having a unique identifier.

A further advantage of the invention is that the operating system manages a dynamic, temporary table for each application identifier which can maintain the usage authorisations for the resources already authorised for each of the applications.

A further advantage of the invention is that the operating system releases the access authorisations to a resource for the application identified at the expiry of the allocated time or on leaving a geographically predetermined area.

A further advantage of the invention is that the resources of the operating system have memories and/or memory zones on the mobile telephone.

A further advantage of the invention is that the resources of the operating system embody means of communication for the mobile telephone.

A further advantage of the invention is that the owners of the resources are at least in the list containing the telephone users, the cellular telephony operator, the manufacturer of the mobile telephone and the content providers.

A further advantage of the invention is that access to resources is centralised at application programming interface (API) level, this interface enabling access to a resource if the application seeking to access this resource has the required rights.

A further advantage of the invention is that each application identifier table associated with a resource contains an identifier corresponding to applications that are not listed in the table to define default rights for an application.

A further advantage of the invention is that default rights can be defined for accessing the resources of a given owner, for example when configuring the mobile telephone in the factory.

A further advantage of the invention is that a table of identifiers containing entries corresponding to electronic certificates enables several families of electronic certificates to be grouped together under a same owner.

A further advantage of the invention is that an access to a resource is contained in the set containing at least the following capabilities: read, write, modify, delete, execute data or executable code.

A further advantage of the invention is that when the telephone is activated, a startup program checks the integrity of the identifier tables and the part of the operating system that accesses these identifier tables.

A further advantage of the invention is that when the telephone is activated, a startup program checks the integrity of the parts of the operating system responsible for telephone's checking and security functions, these checks executed when the mobile telephone is activated guaranteeing that only the system and the manufacturer's original operating system is installed in the telephone and used by the latter.

A further advantage of the invention is that a right of access to a resource is included in the set containing at least the following capabilities: authorised access, one-time authorised access, N-time authorised access, N being configurable, access rejected, ask the user for authorisation once, ask the user for authorisation at each access, ask for authorisation for N accesses, N being configurable, ask for code input once, ask for code input for each access, ask for code input for N accesses, N being configurable, ask for a calculation or a cryptographic challenge to authorise access once, ask for a calculation or a cryptographic challenge to authorise each access, ask for a calculation or a cryptographic challenge to authorise N accesses, N being configurable.

A further advantage of the invention is that the size of the application identifier table is dynamic.

A further advantage of the invention is that each new application is analysed to update the application identifier tables.

BRIEF DESCRIPTION OF THE DRAWING

The invention may best be understood by reference to the following detailed description taken in conjunction with the accompanying drawings. These drawings are provided as an indication only and in no way limit the scope of the invention. The drawings show.

DETAILED DESCRIPTION OF AN EMBODIMENT OF THE INVENTION

Figure 1:
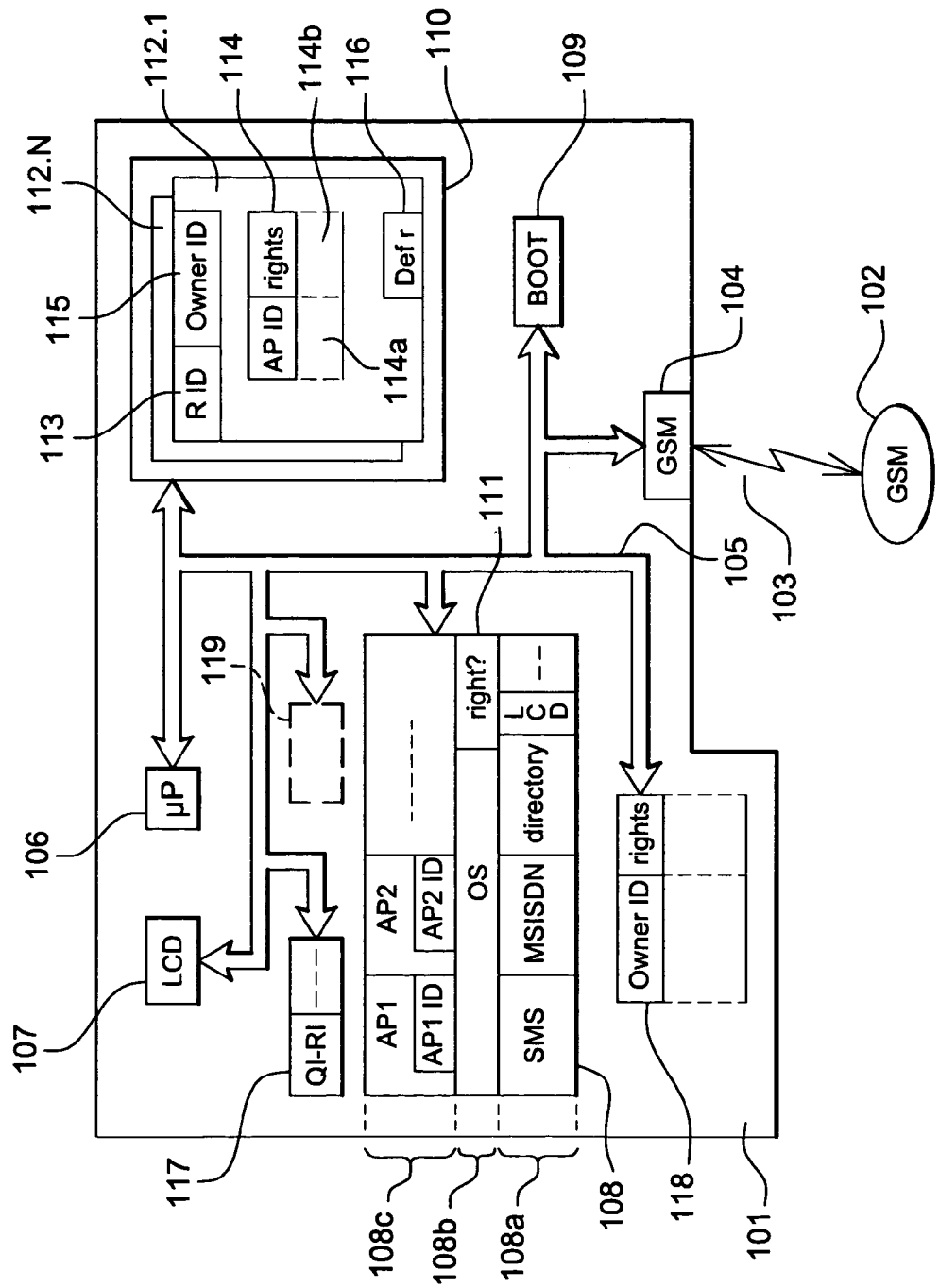
FIG. 1: an illustration of the means enabling the implementation of the process as set forth in the invention.

FIG. 1 shows a mobile telephone (101) connected to a cellular telephony network (102) via an aerial (103) connected to interface circuits (104) between the network (102) and an internal bus (105) that is part of the telephone (101).

The telephone (101) also includes, though without limitation, a microprocessor (106), a screen (107), a program memory (108), a startup memory (109) and an identifier table memory (110). As set forth in the invention Elements (106) to (110) are interconnected by the bus (105). The telephone (101) contains other devices that are not represented such as a keyboard and a microphone, . . . , the list is not exhaustive.

When an action is said to be performed by a device, it is in fact executed by a microprocessor in this device controlled by instruction codes recorded in a program memory on the said device. An action is also ascribed to an application. This means that part of the instruction codes making up the application are executed by the microprocessor.

The memory (109) contains instruction codes executed by the microprocessor (106) when the telephone is switched on (101). In practice this is a ROM or a PROM, thereby making the corruption of instruction codes recorded in the memory very difficult and a specialist task.

The memory (108) is the program memory of the telephone (101). To enable a better understanding of the invention, the memory (108) has been divided into 3 zones. A resource zone (108a), an operating system zone (108b) allocated more specifically to the management of access to the resources, and a zone (108c) for applications usable by a user of the telephone (101). Zone (108a) corresponds to what is commonly referred to as firmware and contains the drivers that give access to the hardware resources.

Here, a resource is understood to be a general concept. In practice it is either a hardware resource, a functionality of the telephone (101) or one or more objects.

The hardware resource may be a memory zone on the telephone (101), the zone being part of the telephone, in a removable storage component or an extension of the telephone's functionalities, or on a SIM/USIM card connected to the telephone (101). In the case of a multimedia content stored in the telephone, the resource can be defined as the storage zone for these multimedia contents or as several zones, each corresponding to a unique content. A resource can also be described as a range of addresses on a bus.

A resource can also be seen as a function. Such functions include, for example, reading from or writing to a memory zone, reading from or writing to an extension port (Infrared, Bluetooth, serial connection, the list is not exhaustive . . . ), using the functionalities of a coprocessor or an active component through a range of memory addresses or an application programming interface (API), reading, writing, sending, or receiving an SMS, an MMS, a message, an e-mail, reading the IMEI of the telephone, reading the cell identifier on the base station to which the telephone is connected, reading the geographic location of the telephone whatever the system of acquisition of geographic coordinates used (for example via an application programming interface with a GPS system), reading or writing in the telephone directory (the directory in fact corresponding to a memory zone), displaying or erasing an object on the screen, sending a command to the SIM/USIM card, . . . , the list is not exhaustive.

A resource can also correspond to one or more different objects (directory, item in a directory, calendar data, one or more games, a piece of music, a film . . . , this list does not limit the scope of the invention)

The resources can also make up what can be referred to as an application programming interface (API): an API is a set of functions that can be implemented by an application. In our example a centralised interface contains all the functions enabling access to the resources on the telephone. There is no alternative way for an application to access a resource than to implement a centralised interface function.

Zone (108) corresponds to the operating system that generally contains the zone (108a). Here we have separated it to highlight the fact that the operating system contains a module (111) that checks the resource access rights.

Zone (108c) contains the instruction codes of the applications installed on the telephone (101). An application may, for example, be an agenda, a pocket calculator, an electronic message system client (SMS, MMS, e-mail or other), games, mono or multimedia viewers, . . . , the list is not exhaustive. Each application is identified by an application identifier.

The memory (108) is illustrated in such a way as to illustrate that an application seeking to access a resource on the mobile telephone does so via the operating system, in other words via the resource access rights checking module (111). Each resource is identified by a resource identifier.

The memory (110) is subdivided into records (112.1) to (112.N), each record being identified by a resource identifier (113). A record also contains a table (114) associating application identifiers (114a) with rights (114b). Rights are, for example, read, write, access subject to an authorisation request, access subject to a code input.

The size of the table (114), including the record (112), is variable, depending on the number of application identifiers that it contains. The size of a table like this is increased as and when required. This enables efficient management of the memory on the mobile telephone. If the table is too small to accommodate the registration of a new right, its size is increased dynamically.

A record in memory (114) also contains a field (116) containing default rights. These rights are applied when an application seeking to access the resource is not described by a specific identifier in the record in memory (110) that corresponds to the resource.

In an alternative embodiment of the invention a record (112) also contains an owner identifier (115). An owner identifier is either a random alphanumerical word, or a digital signature of the contents of a resource or an application by a certificate. The resulting signature is associated with the public part of the certificate that enabled the production of the signature. This makes it possible to check the signature and thereby confirm the owner's identity.

Figure 2:
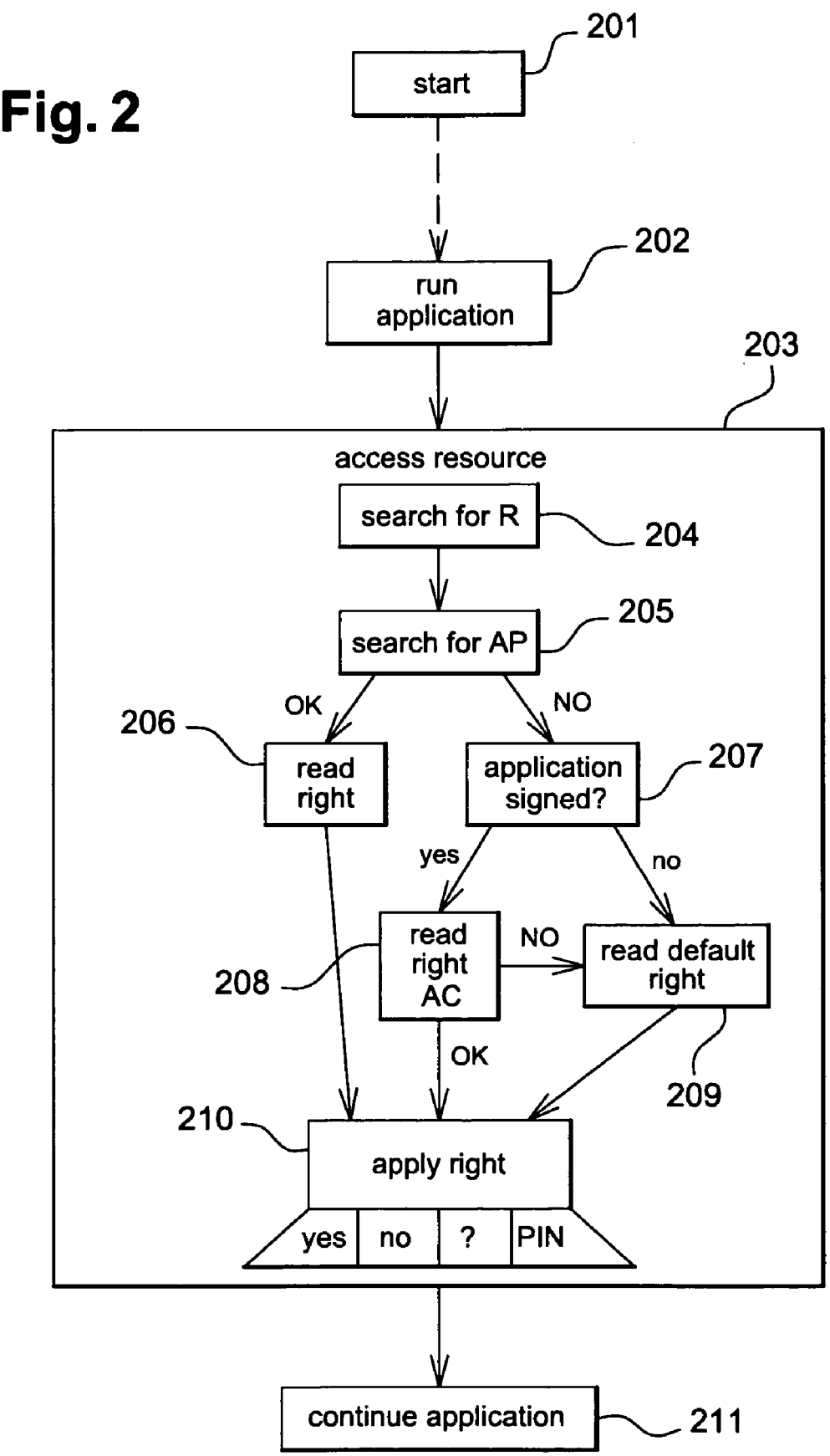
FIG. 2: an illustration of the steps in the process as set in forth in the invention.

FIG. 2 shows a preliminary step (201) in which a user of telephone (101) switches it on. The microprocessor then executes the instruction codes recorded in the memory (109). In an alternative embodiment of the invention the instruction codes in the memory (109) enable the module (111) and the memory (110) to be validated, for example, by calculating a check sum or by a cryptographic validation of the integrity with proof of the origin of the code, authenticating the fact that the manufacturer of the telephone did indeed implement the modules (111) and the memory (110). This guarantees that the policy of access to the resources of telephone (101) has not been modified.

From step (201), the process continues with steps involving the possible uses of telephone (101) one of which is step (202), starting an application. An example is the activation of a telephone directory consultation application contained in the telephone (101). In practice, a directory of this kind corresponds to a memory zone in the telephone (101).

Once the application has been started, it will, in a step (203) attempt to access one or several resources on the telephone (101). When an application seeks to access a resource, this attempted access is intercepted by the module (111). At the moment the module (111) intercepts the attempt, it knows the application from its idAP identifier, and the resource that the application is seeking to access from its idR identifier.

In step (203) module (111) performs several actions. In step (204) module (111) searches in memory (110) for the record corresponding to identifier idR. Once this record, for example (112.1), has been located, processing continues with step (205), the search for the application identified by idP in table (114) of record (112.1).

If this search (205) is successful, the process continues with step (206), otherwise it continues with step (207).

Step (205) consists of a sequential scan of table (114) until a line is encountered in which the contents of column (114a) correspond to the idAp identifier, or through to the end of table (114). This makes it possible to determine a line in table (114), or respectively to conclude that there is no identifier idAp in table (114).

In step (206) module (111) reads the contents of column (114b) corresponding to the line determined in step (205). This is a step in which rights are read. After step (206) processing continues with step (210) in which the right is applied.

In step (207) module (111) seeks to read an identification certificate linked to the application. This certificate is recorded in the application in the same way as the application identifier. If a certificate of this type exists, the process continues with step (208), otherwise the process continues with step (209).

In step (208) the module (111) starts by checking the validity of the certificate. To do this, the mobile telephone contains a number of pre-recorded certificates, for example, an operator certificate in the SIM card, a manufacturer certificate in the startup code and a content provider certificate in the mobile telephone or the SIM card. To be valid, the application certificate must be compatible with one of the certificates known by the telephone (101). This compatibility is checked, for example, by the encryption of a random number from a key in the application certificate, one of the certificates known by the telephone enabling the random number to recover the random number.

In an alternative embodiment the application also contains a signature linked to the certificate that it presents. This signature is an electronic signature based on the private key of the certificate and the contents of the application, in other words the instruction codes that compose it. The check is thus performed in conventional manner, based on the public key of the certificate and the content of the application.

If the certificate is valid, the module (111) scans the table (114) to find the application certificate, and, as for an application identifier, this is used to find a line in table (114), and consequently read rights. In this embodiment, the record (112.x) thus contains a table associating certificates with access rights to the resource identified by the contents of field (113). This association is achieved through a signature of the application content by the certificate.

If the certificate is valid, step (208) is followed by step (210), otherwise it is followed by step (209).

The module (111) results in step (209) if it has been impossible to identify the application by any method. In this case the rights applied will be default rights, corresponding to the contents of field (116).

In an alternative embodiment of the invention, the default rights must be defined according to the owner of the resource. If the field (116) contains no information for a resource that an application is seeking to access, there is a table (118) recorded in a memory connected to bus (105) and associating default rights with an owner. The applicable rights are looked up in this table (118) according to the identifier (115) of the owner of the resource to which access is sought. Data is entered in the table, for example, when the telephone is manufactured. It can also subsequently be updated.

In an alternative embodiment default rights can also be determined on the basis of a certificate attached to the application or of an application owner. In this case an application contains a certificate or an owner identifier. A memory (119) or telephone (101), connected to bus (105), thus contains a table associating a certificate and an owner with default rights.

In an alternative embodiment of the invention, the memory (119), or another memory not described herein can be used to associate several certificates with a certificate referred to as "master". This master certificate corresponds to an owner and consequently to associated rights. In particular the owner identified via the master certificate can modify rights associated with the certificates, themselves associated with the master certificate.

From step (209) the process continues with step (210).

In step (210), module (111) answers the application that requested access to a resource according to the rights read in steps 206, 208 or 209.

This answer is either: authorised access, rejected access, request user authorisation, request code input, or request a cryptographic challenge.

Authorised access can be broken down into the following levels: read, write, modify, delete, execute.

The authorisation request to the user appears in the form of a message displayed on the screen (107). Typically the message will look like this: "application Ap wants to access R. Authorise: yes/no?".

The request to the user for a code appears in the form of a message displayed on the screen (107). Typically the message will look like this: "application Ap wants to access R. Enter code:".

In the case of a cryptographic challenge, there is no request for user authorisation, the telephone itself managing the authorisation of access to the application if the answers to the cryptographic challenges do not match those expected by module (111).

The answers to these messages determine how the execution of the application will continue. In other words, if the answers to these questions are positive and the code is correct or the cryptographic challenges are valid, the access is authorised, otherwise the access is rejected.

In an alternative embodiment, the application can be authorised for a configurable number N of accesses.

From step (203) the process continues with step (211), continuing the execution of the application. In this step the application receives an answer from module (111) to its request for access to a resource. If the answer is positive, execution continues normally, otherwise it is interrupted.

In an alternative embodiment the component (111) keeps and maintains a context relative to the authorisation granted for the said application or instance of the application to access the resource such as to enhance the performance of the system by not having to constantly retest the access rights to the resources. This involves managing a table (117) recorded in a temporary and dynamic authorisation memory that is connected to bus (105), indexed by idAP and containing the authorised resources, or that is indexed by idAP and the identification of the instance in cases where the application is instanced several times. The table (117) is, for example, a cache memory that keeps the results of queries from step (203). This therefore obviates the need to access memory (110) to get the answer to a query that has already been processed. In another example, memory (117) is a copy of part of memory (110), the said part corresponding to sections of application identifier tables, these sections of tables being those that have already been read through.

In an alternative embodiment the access rights to the resource are also memorised in the temporary tables and released when the resource is freed.

In an alternative embodiment, the access authorisations can be allocated for a predetermined period of use and released when the resource is freed or at the expiry of the allocated usage period. The definition of this period may be global for all resources on the mobile telephone, specific to an application, or specific to each accessed resource. The usage time of the resource or resources can be calculated by implementing a specific timer by resource, by application, by application and resource, or globally by application for a set of resources, by resource for a set of applications or for a set of applications for a set of resources. In this embodiment, for example, table (117) is used by associating with each query result a condition of validity that may be temporal, by number of queries, or by geographic area. As soon as the condition of validity expires, the corresponding entry in table (117) is deleted and memory (110) has to be read through again.

In an alternative embodiment, access authorisations and access rights can be allocated for a predefined geographic space, the fact that the mobile telephone leaves the conditions defined by the geographic area automatically causing the resource to be freed. The usage condition linked to this geographic area can be defined in a similar way to the definition of usage periods, in other words specifically or globally by resource and/or by application, for several resources and/or several applications.

In an alternative embodiment the authorisation of a predetermined number N of accesses can be granted in a similar way to the definition of usage periods, in other words specifically or globally by resource and/or by application, for several resources and/or several applications.

Insofar as memory (110) is itself a resource, its access, notably for modification, is subject to the same authorisation mechanism. It is to be noted here that a memory, for example memory (114), can correspond to several resources, one resource grouping together records corresponding to network operator functionalities, a resource grouping together records corresponding to user functionalities, a resource grouping together the records corresponding to functionalities supplied by the manufacturer of the mobile telephone, and a resource grouping together the records corresponding to content provider functionalities. Each of these resources is updated for a specific application that can only be run respectively by the network operator, the user, the operating system and the content provider.

In an alternative embodiment, the record (114) contains an owner identifier field (115). In this embodiment an application seeking to modify the content of record (114) can only do so if the said application and the record (114) have the same owner.

These security mechanisms make it possible to efficiently manage a telephone security policy while at the same time partitioning resources by resource owners. In other words, only the owner of a resource can modify the access rights to this resource.

These mechanisms enable great flexibility in the management of usage rights, because an application identified by the operating system and managed by the module (111) can also be identified as a resource on the telephone. This is particularly true in the downloading of games, a game being both an application with limited rights and a resource requiring protection against copying and misuse.

Thus, an application seeking to introduce data into the telephone (101) via a serial interface (for example Bluetooth), must be in the list of applications authorised to write in a certain memory zone and in the list of applications authorised to read the memory zone corresponding to a buffer memory for incoming data received via the serial interface.

An application seeking to output via a serial interface, for example, data contained in the telephone (101) must be in the list of applications authorised to write in a certain memory zone, corresponding to a data output buffer memory via the serial interface. In an alternative embodiment, the serial interface module is a resource, and an application seeking to issue data must be in the list of applications authorised to implement the serial interface module. In this example a user wishing to issue data via the serial interface must use an application, on one hand to read this data, in other words the application will have rights recorded on this data or resources and, on the other, to issue data via the serial interface. Here the serial interface is chosen as an example, another communication interface can be used as an illustration of the invention, namely Wifi, infrared, or the various possibilities of external memory extension (or even the telephone's external bus). This has particular potential for the protection of multimedia content. This is because if the content player application is not authorised to duplicate the content other than via a loudspeaker and/or a screen, this will prevent the content from being extracted from the telephone. Likewise, if the content is identified as a resource, only the player application will be able to access and modify it, the file management systems no longer being authorised to manipulate the digital content, the only way to manipulate the files containing this content will be through the player application. In the perspective of managing digital rights, if one considers that a player application is distributed on a large scale and that this application is associated with several electronic certificates (one certificate by record or film publisher), the fact of defining a digital content as a resource associated with electronic certificates known by the application or the telephone will imply that only the application can access this content. In this context, the owner of the application and resources (digitally encoded content) being the content provider, neither the telephone user, the operator, the manufacturer or the other content provider can alter the rights associated with this application and the resources (digitally encoded content).

In an alternative embodiment, a manufacturer's application installed in the mobile telephone has the right to read, write and erase all the memory zones reserved for the use of the mobile telephone (purge or cleaning of a memory zone). In an alternative embodiment an authentication of the user of this application can be implemented.

In order to optimise the use of the invention, when a new application is installed on the mobile telephone, this application is analysed to detect all the calls made to the telephone's resources. The identifier of the new application is then written in the identifier tables according to either default rights, or answers to questions put to the user of the telephone. The application analysis application therefore has the rights needed to access the resource corresponding to rights management. This application is in fact part of the operating system.

In an alternative embodiment the telephone (101) contains a programme installed by the manufacturer, capable of reading, writing and erasing all the memory zones from the mobile telephone. Typically this might be a reinitialisation program.

What is claimed is:

1. Process for the secure management of the execution of applications on a mobile telephone (101) having an aerial for communication with a telephony network, an application (108c) accessing the resources (108a) on the mobile telephone managed by an operating system, wherein a resource on the mobile telephone is identifiable (113) and associated with a table (114) containing the identifiers of applications which may or not be authorized to implement the resource, the resource including the communication of a message with a base station of the telephony network, the resource having an owner (115), who solely has the right to update the list of applications, the operating system seeking for and applying, for each accessed resource, the rights corresponding to the accessing application, each application having a unique identifier (idAp), and wherein the operating system releases the access authorizations to a resource for the identified application upon leaving a predetermined geographic area.

2. Process as set forth in claim 1 wherein the operating system manages one dynamic and temporary table for each application identifier, enabling the maintenance of the resource usage authorizations for the resources already authorised for each of the applications.

3. Process as set forth in claim 2 wherein the operating system releases the access authorizations to a resource for the identified application upon expiry of the allocated time.

4. Process as set forth in claim 1, wherein the resources of the operating system contain memories and/or memory zones on the mobile telephone.

5. Process as set forth in claim 1, wherein the resources of the operating system contain the means of communication for the mobile telephone.

6. Process as set forth in claim 1, wherein the owners of the resources are at least in the list made up of users of the telephone, the mobile telephone operator, the manufacturer of the mobile telephone and the content providers.

7. Process as set forth in claim 1, wherein the access to resources is centralised in an application programming interface (API), this interface enabling access to a resource, provided that the application seeking access to the resource owns the required rights.

8. Process as set forth in claim 1, wherein each application identifier table associated with a resource contains an identifier (116) corresponding to the applications not listed in the table to define the default rights for an application.

9. Process as set forth in claim 1, wherein default rights can be defined to access the resources of a given owner, this definition being part of the factory configuration of the mobile telephone.

10. Process as set forth in claim 1, wherein a table of identifiers containing the entries corresponding to electronic certificates makes it possible to group together under a given owner several families of electronic certificates.

11. Process as set forth in claim 1, wherein an access to a resource is one of a set containing at least the following capabilities: read, write, modify, delete, execute, data or executable code.

12. Process as set forth in claim 1, wherein, when the telephone is activated, a startup program checks the integrity of the identifier tables and the part of the operating system accessing these identifier tables.

13. Process as set forth in claim 1, wherein, when the telephone is activated, a startup program checks the integrity of the parts of the operating system responsible for the telephone's checking and security functions, these checks, conducted when the mobile telephone is activated guaranteeing that only the system and only the manufacturer's original operating system are installed in and used by the telephone.

14. Process as set forth in claim 1, wherein an access right to a resource is included in a set containing at least the following capabilities: authorized access, one-time authorized access, N-time authorized access, N being configurable, access rejected, ask the user for authorized once, ask the user for authorization at each access, ask for authorization for N accesses, N being configurable, ask for code input once, ask for code input for each access, ask for code input for N accesses, N being configurable, ask for a calculation or a cryptographic challenge to authorize access once, ask for a calculation or a cryptographic challenge to authorize each access, ask for a calculation or a cryptographic challenge to authorize N accesses, N being configurable.

15. Process as set forth in claim 1, wherein the size of the application identifier table is dynamic.

16. Process as set forth in claim 1, wherein each new application is analysed to update the application identifier tables.

17. Process as set forth in claim 1, wherein one of the manufacturer's applications installed in the mobile telephone has the right to read, write, and erase all the memory zones reserved for use by the mobile telephone.

* * * * *